United States Patent [19]

Kremer

[11] Patent Number: 5,278,824
[45] Date of Patent: Jan. 11, 1994

[54] DUAL HUBBING IN A BIDIRECTIONAL LINE-SWITCHED RING TRANSMISSION SYSTEM

[75] Inventor: Wilhelm Kremer, Dracut, Mass.

[73] Assignee: AT&T Bell Laboratories, Murray Hill, N.J.

[21] Appl. No.: 892,105

[22] Filed: Jun. 2, 1992

[51] Int. Cl.[5] .............................................. H04L 1/00
[52] U.S. Cl. ..................................... 370/15; 370/16.1; 371/11.2; 371/20.6
[58] Field of Search ..................... 370/14, 15, 16, 16.1, 370/85.12, 85.15; 379/5, 279; 340/825.01, 825.05, 827; 371/8.2, 11.2, 20.6; 359/119

[56] References Cited

U.S. PATENT DOCUMENTS

| | | | |
|---|---|---|---|
| 4,538,264 | 8/1985 | Bahr et al. | 371/8 |
| 4,835,763 | 5/1989 | Lau | 370/16 |
| 5,150,356 | 9/1992 | Tsutsui | 370/85.12 X |
| 5,159,595 | 10/1992 | Flanagan et al. | 370/16 X |
| 5,179,548 | 1/1993 | Sandesara | 370/16.1 |

OTHER PUBLICATIONS

U.S. patent application, William C. Marra, Ser. No. 07/892,079, filed Jun. 2, 1992.
"SONET Line Protection Switched Ring APS Protocol", T1X1.5/91-026, J. Baroni et al., AT&T Network Systems, Feb. 6, 1991.
"SONET Ring Applications for Survivable Fiber Loop Networks", *IEEE Communications Magazine*, Jun. 1991, J. Sosnosky et al., pp. 51-58.
"Further Considerations on 2-Fiber Bidirectional Line Switched OC-48 Rings", Contribution to T1 Standards Project—T1X1.5/91-019, G. Copley et al., Feb. 6, 1991.
Co-pending U.S. patent application W. Kremer Case 1, Ser. No. 07/855,795, filed Mar. 26, 1992.

*Primary Examiner*—Douglas W. Olms
*Assistant Examiner*—Melvin Marcelo
*Attorney, Agent, or Firm*—Thomas Stafford

[57] ABSTRACT

Communications circuit connectivity in a bidirectional line-switched ring transmission system is continued in the presence of the failure of a first ring node for communications circuits terminated in the ring node which are redirectable to an alternate (dual hubbing) ring node. The communications circuit are redirected by establishing a bidirectional communications circuit to the alternate ring node. In one example, redirection of the communications circuits is further realized by not squelching communications circuits terminated in the failed ring node in a ring node adjacent the failed ring node on one prescribed side which normally would have been squelched, while squelching communications circuits terminated in the failed ring node in a ring node adjacent to the other side of the failed ring node. This allows the redirectable communications circuits to be loop back switched so that they may be redirected to the alternate ring node. Then, the alternate ring node directly intercepts the redirected communications circuits. This is realized by providing provisioning information to the ring nodes which includes the identity of all communications circuits active in the ring and whether there is an alternate ring node to which any of the communications circuits may be redirected.

33 Claims, 7 Drawing Sheets

RING NODE ID TABLE

| NODE ID |
|---------|
| 101 ID |
| 102 ID |
| 103 ID |
| 104 ID |
| 105 ID |
| 106 ID |

FIG. 6

COMMUNICATIONS CIRCUIT ID TABLE FOR RING NODE 102

| STS # | A TERMINATION | Z TERMINATION(S) | REDIRECTABLE COMMUNICATIONS CIRCUIT |
|-------|---------------|------------------|-------------------------------------|
| a | 101 | 102 | NO |
| b | 102 | 104,106 | NO |
| c | 101 | 103,(105) | YES |
| d | 102 | 106 | NO |
| e | 101 | (103),105 | YES |
| ⋮ | ⋮ | ⋮ | ⋮ |

DUAL HUBBING IN A BIDIRECTIONAL LINE-SWITCHED RING TRANSMISSION SYSTEM

TECHNICAL FIELD

This invention relates to ring transmission systems and, more particularly, to bidirectional line-switched ring transmission systems.

BACKGROUND OF THE INVENTION

It has become increasingly important to maintain communications connectivity in the presence of transmission system failures. To this end, bidirectional line-switched ring type transmission systems have been proposed that heal communications circuits in the presence of equipment failures, fiber cuts and ring node failures. To prevent misconnections of communications circuits under ring node failure conditions, bidirectional line-switched ring arrangements employ a so-called squelching mechanism to eliminate communications circuits that were destined for a failed ring node. Heretofore, when a ring node failed in a bidirectional line-switched ring there was no operative mechanism for redirecting a simple duplex communications circuit which was to be squelched because it terminated in the failed ring node. Indeed, in bidirectional line-switched ring transmission systems, duplex communications circuits which terminate at a failed ring node were "squelched", i.e., prevented from propagating further in the bidirectional line-switched ring, in order to prevent a misconnection with another duplex communications circuit propagating in the other direction of the bidirectional line-switched ring. Consequently, the communications circuit connectivity was lost, resulting in a communications failure.

SUMMARY OF THE INVENTION

The problems related to a failed ring node in a bidirectional line-switched ring transmission system are overcome, in accordance with the invention, by redirecting communications circuits destined for a particular failed ring node, for example, a first hubbing ring node, to a second particular alternate ring node, for example, a second hubbing ring node. This redirecting is realized, in accordance with the principles of the invention, by establishing a bidirectional communications circuit connection to the alternate ring node, where the communications circuit is now to be terminated. In one example, the redirection of the communication circuit is further realized by controllably not squelching communications circuits terminated in the failed ring node in a ring node adjacent a prescribed side of the failed ring node, while squelching communications circuits in a ring node adjacent to the other side of the failed ring node. This allows the redirectable communications circuits to be loop back switched so that they may be redirected to the alternate ring node. The established bidirectional communications circuit is such that the alternate ring node directly intercepts the communications circuit(s) being redirected to it. To this end, communications circuit provisioning information for each particular ring node includes the identity of all the ring nodes in which communications circuits active in the particular ring node terminate and whether there is an alternate ring node to which the communications circuit may be redirected. The provisioning information is provided whether the communications circuits are to be added and/or dropped by the particular ring node or passed through the particular ring node.

A technical advantage of the invention is that no additional service bandwidth need be allocated nor is protection access used. Further, protection bandwidth is now available to restore communications circuits which in prior bidirectional ring transmission systems would not have been available for this purpose.

DETAILED DESCRIPTION

Figure 1:
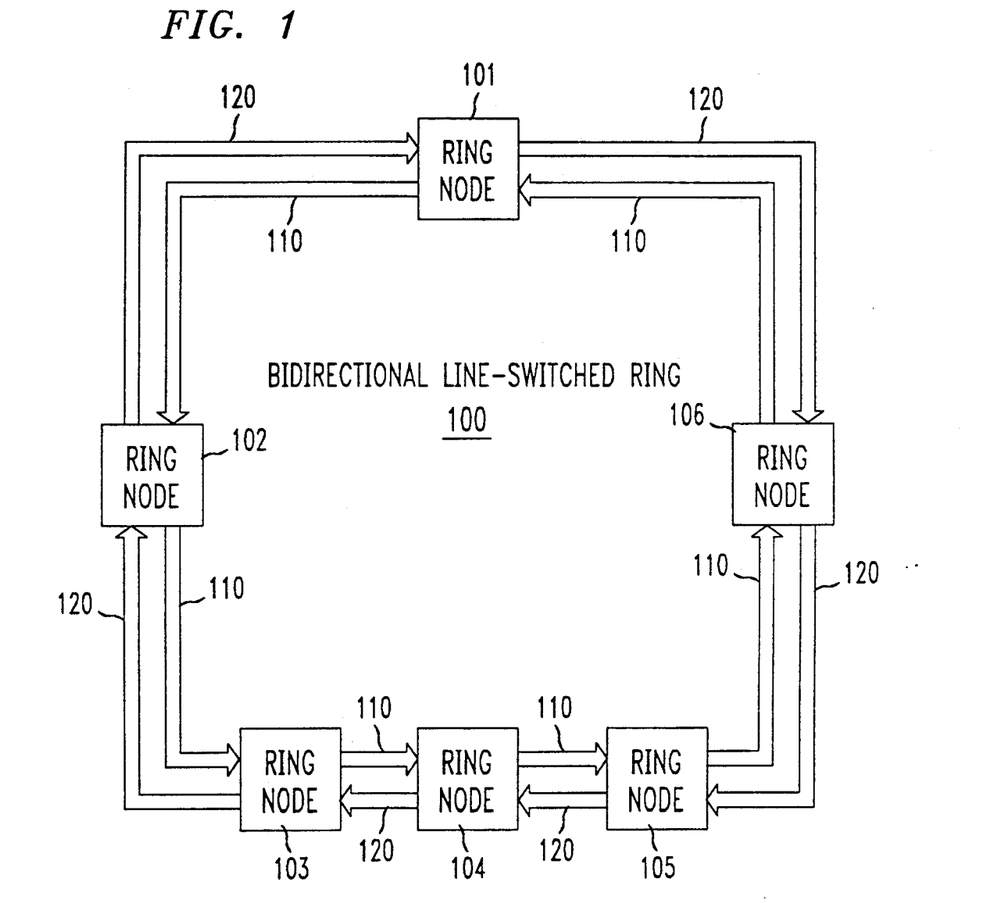
FIG. 1 shows, in simplified block diagram form, a bidirectional line-switched ring transmission system including ring nodes incorporating the invention.

FIG. 1 shows, in simplified form, bidirectional line-switched ring transmission system 100, which for brevity and clarity of exposition is shown as including only ring nodes 101 through 106, each incorporating an embodiment of the invention. Ring nodes 101 through 106 are interconnected by transmission path 110 in a counter-clockwise direction and by transmission path 120 in a clockwise direction. In this example, transmission paths 110 and 120 are comprised of optical fibers and each could be comprised of a single optical fiber or two (2) optical fibers. That is, bidirectional line-switched ring transmission system 100 could be either a two (2) optical fiber or a four (4) optical fiber system. In a two (2) optical fiber system, each of the fibers in transmission paths 110 and 120 includes service bandwidth and protection bandwidth. In a four (4) optical fiber system, each of transmission paths 110 and 120 includes an optical fiber for service bandwidth and a separate optical fiber for protection bandwidth. Such bidirectional line-switched ring transmission systems are known. In this example, transmission of digital signals in the SONET digital signal format is assumed. However, it will be apparent that the invention is equally applicable to other digital signal formats, for example, the CCITT synchronous digital hierarchy (SDH) digital signal formats. In this example, it is assumed that an optical OC-N SONET digital signal format is being utilized for transmission over transmission paths 110 and 120. The SONET digital signal formats are described in a Technical Advisory entitled "Synchronous Optical Network (SONET) Transport Systems: Common Generic Criteria", TA-NWT-000253, Bell Communications Research, Issue Sept. 6, 1990.

It is noted that requests and acknowledgements for protection switch action are transmitted in an automatic protection switch (APS) channel in the SONET overhead accompanying the protection bandwidth on each of transmission paths 110 and 120. The APS channel, in the SONET format, comprises the K1 and K2 bytes in the SONET overhead of the protection bandwidth. The K1 byte indicates a request of a communications circuit for switch action. The first four (4) bits of the K1 byte indicate the switch request priority and the last four (4) bits indicate the ring node identification (ID). The K2 byte indicates an acknowledgement of the requested protection switch action. The first four (4) bits of the K2 byte indicate the ring node ID and the last 4 bits indicate the action taken. For purposes of this description, a "communications circuit" is considered to be a SONET STS-3digital signal having its entry and exit points on the ring.

Again, it should be noted that there are applications in bidirectional line-switched ring transmission systems when it is desirable to redirect a communications circuit, in accordance with the principles of the invention, to another designated ring node when a designated terminating ring node for the circuit has failed. Dual (or alternate) hubbing is one such application. Thus, in one application of the invention ring node 103 is the designated terminating ring node for the communications circuit and ring node 105 is the alternate ring node which the circuit is redirected to when ring node 103 fails. Similarly, in another application ring node 105 is the designated terminating ring node for a communications circuit and ring node 103 is the alternate ring node which the circuit is redirected to when ring node 105 fails.

Each of ring nodes 101 through 106 comprises an add-drop multiplexer (ADM). Such add-drop multiplexer arrangements are known. For generic requirements of a SONET based ADM see the Technical Reference entitled "SONET ADD-DROP Multiplex Equipment (SONET ADM) GENERIC CRITERIA", TR-TSY-000496, Issue 2, September 1989, Supplement 1, September 1991, Bell Communications Research. In this example, the ADM operates in a transmission sense to pass signals through the ring node, to add signals at the ring node, to drop signals at the ring node, to bridge signals during a protection switch and to loop-back-switch signals during a protection switch at the ring node.

Figure 2:
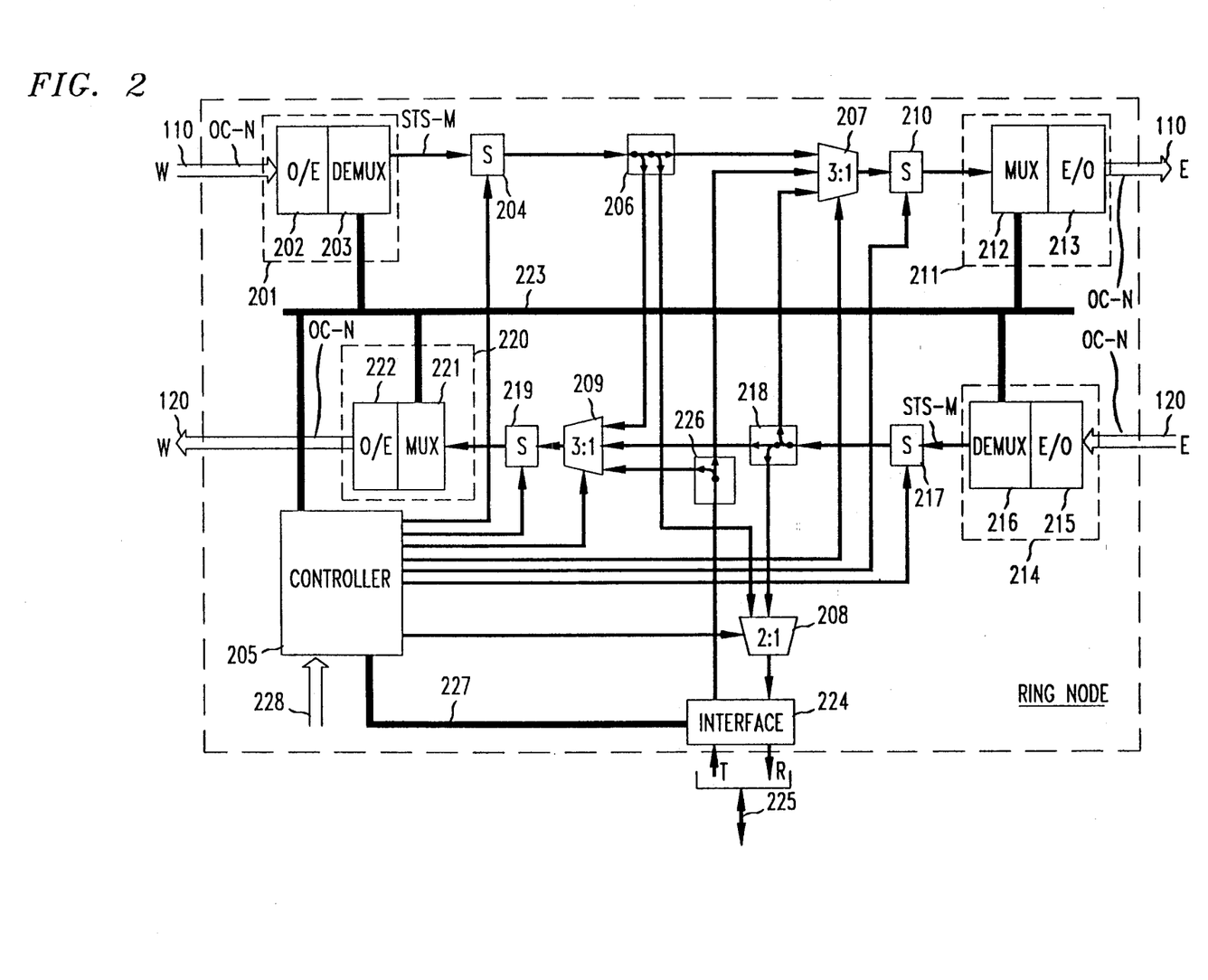
FIG. 2 shows, in simplified block diagram form, details of a ring node including an embodiment of the invention.
Figure 3:
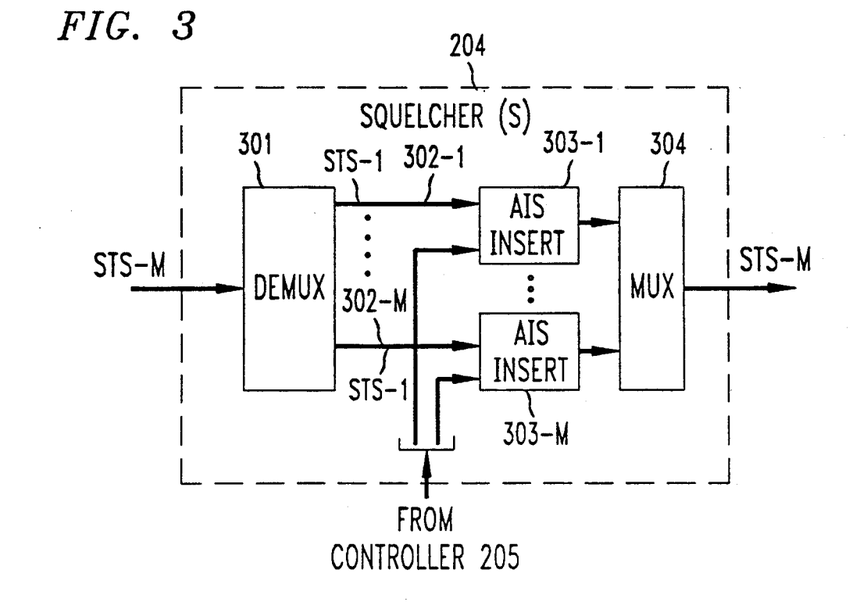
FIG. 3 shows, in simplified block diagram form, details of a squelcher used in the ring node of FIG. 2.
Figure 4:
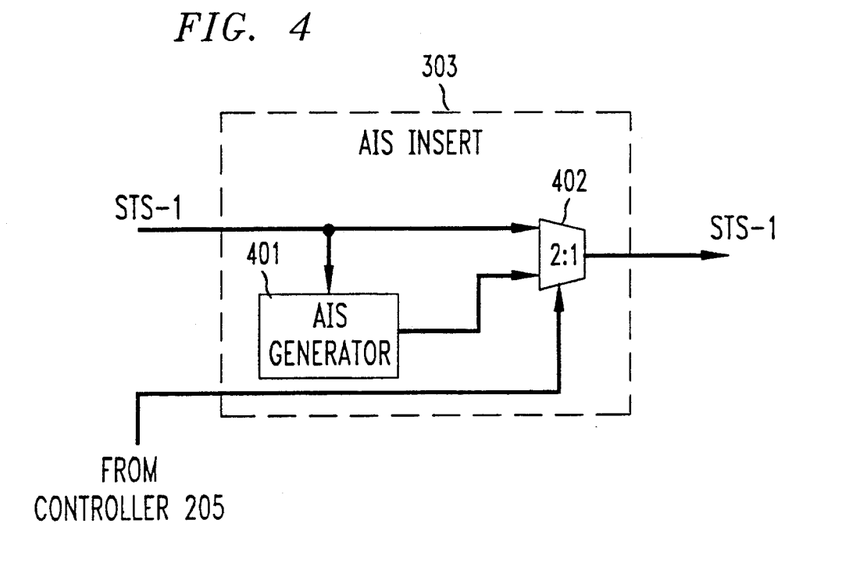
FIG. 4 shows, in simplified block diagram form, details of an AIS insert unit employed in the squelcher of FIG. 3.

FIG. 2 shows, in simplified block diagram form, details of each of ring nodes 101 through 106, including an embodiment of the invention. In this example, a west (W)-to-east (E) digital signal transmission direction is assumed in the service bandwidth and the protection bandwidth on transmission path 110. It will be apparent that operation of the ring node and the ADM therein would be similar for an east (E)-to-west (W) digital signal transmission direction in the service bandwidth and the protection bandwidth on transmission path 120. Specifically, shown is transmission path 110 entering the ring node and supplying an OC-N SONET optical signal to receiver 201, where N could be, for example, 12 or 48. Receiver 201 includes an optical/electrical (O/E) interface 202 and a demultiplexer (DEMUX) 203, which yields at least one (1) STS-M SONET digital signal. Such O/E interfaces and demultiplexers are known. In this example, M is assumed to be three (3) and N is greater than M. The STS-M signal output from DEMUX 203 is supplied to squelcher (S) 204 which under control of controller 205 controllably squelches, i.e., blocks, particular incoming communications circuits by inserting an alarm indication signal (AIS), as described below. Details of squelcher (S) 204 are shown in FIGs. 3 and 4 and its operation is described below. Thereafter, the STS-M signal, squelched or otherwise, is supplied to broadcast element 206. A broadcast element replicates the STS-M signal supplied to it and supplies the replicated signals as a plurality of individual outputs. Such broadcast elements are known. Broadcast element 206 generates three identical STS-M signals and supplies one STS-M signal to an input of 3:1 selector 207, a second STS-M signal to an input of 2:1 selector 208 and a third STS-M signal to an input of 3:1 selector 209. An STS-M signal output from 3:1 selector 207 is supplied to squelcher (S) 210, which is identical to squelcher (S) 204. Squelcher (S) 210 is employed, under control of controller 205, to squelch particular outgoing communications circuits. The STS-M signal output from squelcher (S) 210 is supplied to transmitter 211 and, therein, to multiplexer (MUX) 212. The output of MUX 212 is an electrical OC-N digital signal, which is interfaced to transmission path 110 via electrical/optical (E/O) interface 213. Such multiplexers (MUXs) and electrical/optical (E/O) interfaces are well known.

Similarly, in the east (E)-to-west (W) direction an OC-N optical signal is supplied via transmission path 120 to receiver 214 and, therein, to optical/electrical (O/E) interface 215. In turn, demultiplexer (DEMUX) 216 yields a STS-M signal which is supplied via squelcher (S) 217 to broadcast element 218. Broadcast element 218 replicates the STS-M signal into a plurality of identical STS-M signals, in this example, three (3). One STS-M signal is supplied to an input of 3:1 selector 207, a second STS-M signal is supplied to an input of 2:1 selector 208 and a third STS-M signal is supplied to an input of 3:1 selector 209. An output from 3:1 selector 209 is supplied via squelcher (S) 219 to transmitter 220. In transmitter 220, multiplexer (MUX) 221 multiplexes the STS-M into an electrical OC-N and, then, electrical/optical (E/O) interface 222 supplies the optical OC-N signal to transmission path 120.

Controller 205 operates to effect the controllable selective squelching of communications circuits, in accordance with the principles of the invention. Controller 205 communicates with receivers 201 and 214 and transmitters 211 and 220 via bus 223 and with interface 224 via bus 227. Specifically, controller 205 monitors the incoming digital signals to determine loss-of-signal, SONET format K bytes and the like. Additionally, controller 205 causes the insertion of appropriate K byte messages for protection switching purposes, examples of which are described below. To realize the desired controllable selective squelching of the communications circuits, controller 205 is advantageously provisioned via bus 228 with the identities (IDs) of all the communications circuits passing through the ring node as well as, those communications circuits being added and/or dropped at the ring node, including whether the communications circuits can be redirected to an alternate ring node, and the identities of all the ring nodes in bidirectional line-switched ring 100. The controllable selective squelching of communications circuits under control of controller 205 to effect the invention is described below.

Interface 224 is employed to interface to a particular duplex link 225 and could include any desired arrangement. For example, interface 224 could include a DS3 digital signal interface to a DSX, a STS-1E (electrical) SONET digital signal interfacing to a DSX, an optical extension interface to an OC-N SONET optical signal or the like. Such interface arrangements are known. Specifically, a signal (R) to be dropped at the ring node is supplied to interface 224 via 2:1 selector 208, under control of controller 205, from either broadcast element 206 or broadcast element 218. In turn, interface 224 supplies the appropriate signal to duplex link 225. A signal (T) to be added at the ring node is supplied from duplex link 225 to interface 224 where it is converted to the STS-M digital signal format, if necessary. The STS-M digital signal is then supplied by broadcast element 226 where it is replicated. The replicated STS-M digital signals are supplied by broadcast element 226 to an input of 3:1 selector 207 and an input of 3:1 selector 209. In this example, 3:1 selectors 207 and 209, under control of controller 205, select the signal being added for transmission in the service bandwidth or the protection bandwidth on either transmission path 110 or transmission path 120.

It should be noted that, in this example, the normal transmission path for a digital signal being added at the ring node would be in the service bandwidth on transmission path 110 and transmission path 120, for example, towards the west (W). If there were to be a protection switch, the signal (T) being added from interface 224 would be bridged via broadcast element 226 and chosen by 3:1 selector 207, under control of controller 205, to the protection bandwidth on transmission path 110. Similarly, if there were to be a loop-back protection switch and the ring node was adjacent to the failure on the so-called "normal" side of the communications circuit, the signal (R) to be dropped at the ring node would be received in the protection bandwidth on transmission path 120 and would be switched from broadcast element 218 via 2:1 selector 208 to interface 224. It is noted that "failure" or "ring node failure" as used herein is intended to include ring node equipment failure and so-called ring node isolation failure caused by optical fiber cuts or the like. Otherwise, the signal (R) to be dropped would be switched in a ring node adjacent the failure from the protection bandwidth on transmission path 120 to the service bandwidth on transmission path 110 and received at the ring node in usual fashion. Then, the signal (R) being dropped from transmission path 110 is supplied via broadcast element 206 and 2:1 selector 208 to interface 224. Note that when the ring node is designated as an alternate, it will directly intercept, in accordance with the principles of the invention, redirected communications circuits which were intended to be terminated in the corresponding failed ring node for which it is an alternate. Depending on the position of the alternate ring node in ring 100 (FIG. 1) relative to its failed ring node for which it is an alternate, the direct intercept of communications circuits is made from either the protection bandwidth or the service bandwidth, as described below.

As indicated above, controller 205 monitors the status of interface 224 and the digital signal supplied thereto via bus 227. Specifically, controller 205 monitors interface 224 for loss-of-signal, coding violations and the like, i.e., a signal failure condition.

Under control of controller 205, digital signals may be passed through, added at, dropped at, bridged at or loop-back-switched at the ring node. A loop-back-switch of an STS-M digital signal incoming in the service bandwidth on transmission path 110 is effected by controller 205 causing 3:1 selector 209 to select the STS-M digital signal from broadcast element 206 and supplying it via squelcher (S) 219 to transmitter 220. In turn, transmitter 220 supplies an OC-N optical signal to the protection bandwidth on transmission path 120. It will be apparent that in the loop-back-switch operation, if the signal is incoming in a service bandwidth on transmission path 110, it will be loop-back-switched to the protection bandwidth on transmission path 120 and vice versa. If the signal is incoming in protection bandwidth on transmission path 110, it will be loop-back-switched to the service bandwidth on transmission path 120 and vice versa. A signal to be added at the ring node is supplied from interface 224, replicated via broadcast element 226 and selected either by 3:1 selector 207 or 3:1 selector 209, under control of controller 205, to be added on transmission path 110 or transmission path 120, respectively. A digital signal to be dropped at the ring node is selected by 2:1 selector 208, under control of controller 205, either from broadcast element 206 (transmission path 110) on broadcast element 218 (transmission path 120). The pass-through and loop-back-switch functions for a signal incoming on transmission path 120 is identical to that for an incoming signal on transmission path 110.

Possible communications circuit misconnections are avoided in bidirectional line-switched ring 100 by controllably squelching communications circuits terminated in a failed ring node in ring nodes adjacent to the failed ring nodes(s). The adjacent failed ring nodes can include a plurality of ring nodes including those that appear to be failed because of being isolated by other failed ring nodes or by fiber and/or cable cuts. To this end, each ring node in bidirectional line-switched ring transmission system 100 is typically equipped to effect the desired squelching via squelchers (S) 204, 210, 217 and 219, under control of controller 205. In this example, both incoming and outgoing communications circuits are squelched. However, if a communications circuit is to be redirected, in accordance with the principles of the invention, it is controllably selectively not squelched in either direction on the so-called normal side of the communications circuit so that a bidirectional communications circuit connection can be made to it at the alternate ring node.

FIG. 3 shows, in simplified block diagram form, details of an exemplary squelcher (S) unit. Specifically, the STS-M digital signal is supplied to demultiplexer (DEMUX) 301 where it is demultiplexed into its constituent M STS-1 digital signals 302-1 through 302-M. The M STS-1 digital signals are supplied on a one-to-one basis to AIS insert units 303-1 through 303-M. AIS insert units 303-1 through 303-M, under control of controller 205, insert the AIS in the STS-1 digital signals included in the communications circuits, i.e., STS-M digital signals, to be squelched. Details of AIS insert units 303 are shown in FIG. 4 and described below. Thereafter, the M STS-1 digital signals are multiplexed in multiplexer (MUX) 304 to yield the desired STS-M digital signal. The details of multiplex schemes for the STS-M digital signal are described in the technical advisory TA-NWT-000253, noted above.

FIG. 4 shows, in simplified block diagram form, details of AIS insert units 303. Specifically, shown is a STS-1 digital signal being supplied to AIS generator 401 and to one input of 2:1 selector 402. AIS generator 401 operates to insert AIS in the STS-1 digital signal. As indicated in the technical advisory TA-NWT-000253, the STS path AIS is an all ones (1's) signal in the STS-1 overhead bytes H1, H2 and H3 and the bytes of the entire STS SPE (synchronous payload envelope). Selector 402 selects as an output, under control of controller 205, either the incoming STS-1 digital signal or the STS-1 digital signal with AIS inserted from AIS generator 401.

Figure 5:
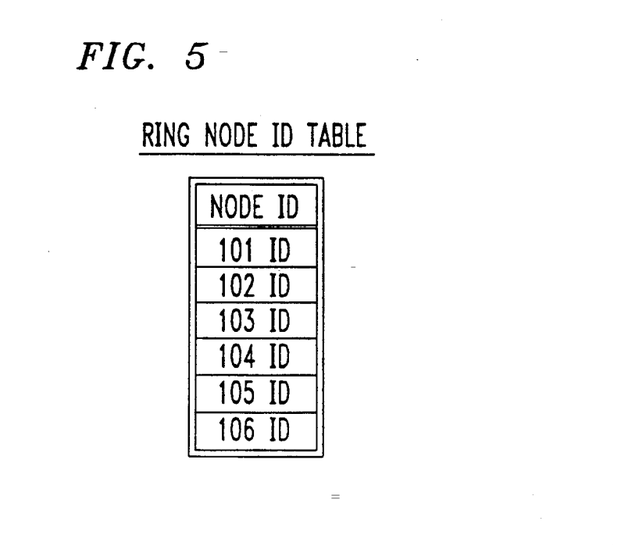
FIG. 5 is an exemplary ring node ID table included in memory of the controller of FIG. 2.

FIG. 5 is a table including the identification (ID) of ring nodes 101 through 106. Entries of the ring node IDs are stored in a look-up table which is provisioned via 228 in memory of controller 205. As indicated above, the ring node IDs are 4 bit words and are included in the second 4 bits of the K1 bytes and the first 4 bits of the K2 bytes in the APS channel.

Figure 6:
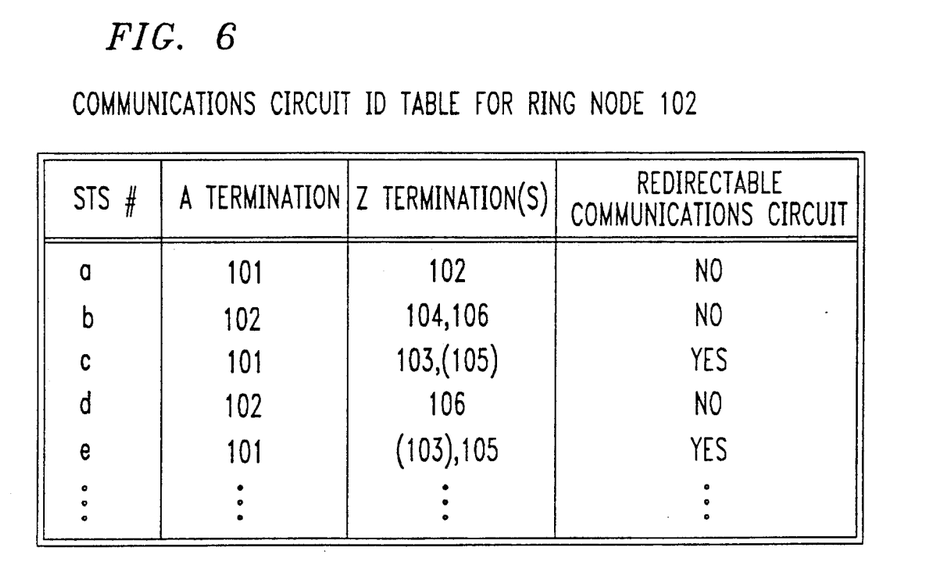
FIG. 6 is an exemplary communications circuit ID table also included in memory of the controller of FIG. 2 for ring node 104.
Figure 7:
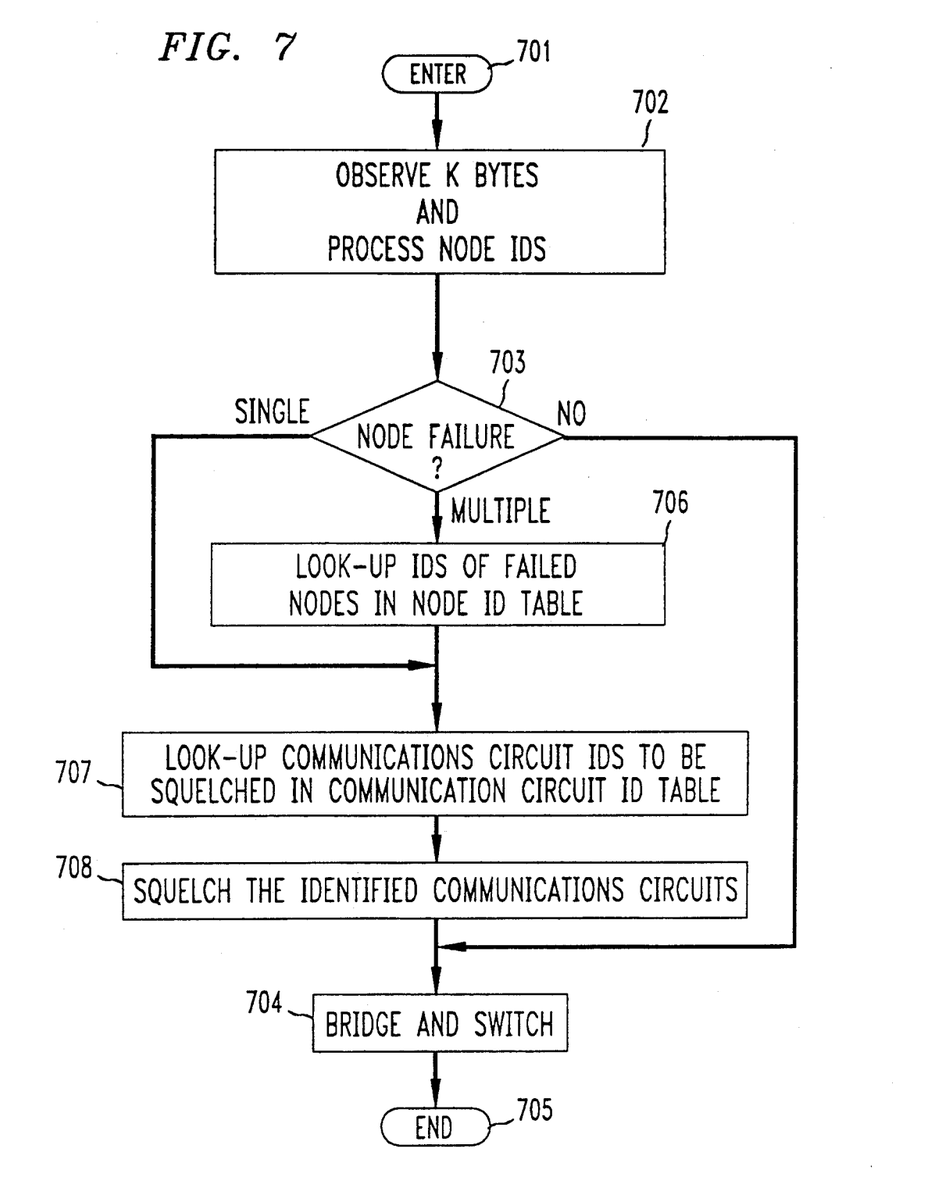
FIG. 7 is a flow chart illustrating the squelch operation of the controller of FIG. 2.

FIG. 6 is illustrative of a table including the identification of all the active communications circuits in a ring node, in this example, ring node 102 for a counter-clockwise orientation of ring nodes 101 through 106. The active communications circuits include those being added, being dropped or passing through ring node 102 and, additionally, those which can be redirected to an alternate ring node. Entries including the IDs indicated in the table of FIG. 6 of the active communications circuits in the ring node is provisioned via 228 in a look-up table in memory of controller 205. Shown in the table of FIG. 6 are the STS-M communications circuit numbers (#) a through e, the ring node including the communications circuit entry point, i.e., the A termination for the communications circuit, and the ring node(s) including the communications circuit exit point(s), i.e., the Z termination(s) for the communications circuit and whether the communications circuit is a redirectable communications circuit. A redirectable communications circuit is one which is to be protected in accordance with the invention. It should be noted that it is not permissible to assign a redirectable communications circuit with the same communications channel from the so-called "other" side of the bidirectional line-switched ring 100 because such assignment would cause a communications circuit misconnection and because that communications circuit does not have to be loop back switched in order to be dropped at the alternate ring node. The alternate (or dual hubbing) ring node for a particular redirectable communications circuit is shown in the table of FIG. 6 in parenthesis. For a communications circuit, for example, STS-M(b) and which is being broadcast to a plurality of ring nodes, all the Z termination ring nodes are shown and it is identified as not being a redirectable communications circuit. A communications circuit terminated in ring node 103 is shown as being redirectable to its alternate ring node 105 and is identified in the provisioning as being a redirectable communications circuit. Thus, the communications circuit ID table of FIG. 6, shows that STS-M(a) enters bidirectional line-switched ring 100 at ring node 101 and exits ring 100 at ring node 102, and is not a redirectable communications circuit. STS-M(b) enters ring 100 at ring node 102 and is broadcast to ring nodes 104 and 106, and is not a redirectable communications circuit. STS-M(c) enters ring 100 at ring node 101 and exits at ring node 103, and is a redirectable communications circuit. If ring node 103 fails, the communications circuits terminated in it will controllably selectively not be squelched in adjacent ring node 102 but will be squelched in adjacent ring node 104, in accordance with the principles of the invention, and will be supplied via loop-back-switching, in this example, to the protection bandwidth of transmission paths 110 and 120. This occurs provided that alternate ring node 105 for communications circuit STS-M(c) has not also failed. At alternate ring node 105 communications circuit STS-M(c) is controllably intercepted from the protection bandwidth of transmission paths 110 and 120, in accordance with the principles of the invention. STS-M(d) enters ring 100 at ring node 102 and exits at ring node 106 and is not a redirectable communications circuit. STS-M(e) enters ring 100 at ring node 101 and exits at ring node 105, and is a redirectable communications circuit. If ring node 105 fails, the communications circuits terminated in it will be squelched in adjacent ring nodes 104 and 106. However, communications circuit STS-M(e) is redirected, in accordance with the principles of the invention, and will be terminated in alternate ring node 103 directly from the service bandwidth of transmission paths 110 and 120. This occurs provided that alternate ring node 103 for communications circuit STS-M(e) has not also failed. Although the ring nodes designated A terminations are considered entry points and the ring nodes designated Z terminations are considered exit points, it will be apparent that the individual communications circuits may be duplex circuits having entry and exit points at each such ring node. FIG. 7 is a flow chart illustrating the operation of controller 205 in controlling the operation of the ring nodes in order to effect the controllable selective squelching of communications circuit in the presence of a ring node failure and the redirection of particular communications circuits to an alternate ring node, in accordance with the invention. Specifically, the process is entered via step 701. Then, operational block 702 causes the K bytes of an incoming OC-N signal to be observed and processes the ring node IDs therein. Then, conditional branch point 703 tests to determine if the processed ring node IDs indicate that one or more ring nodes have failed. Again, a ring node failure is defined as to include ring node equipment failure and so-called ring node isolation failure caused by fiber cuts and the like. Specific examples of failure conditions are discussed below. Thus, if the processed ring node IDs indicate no ring node failure, the failure is other than a ring node and operational block 704 causes the usual bidirectional ring bridging and switching to be effected. Thereafter, the process is ended via step 705. If the processed ring node IDs indicate a multiple ring node failure, operational block 706 causes the failed ring node IDs to be obtained from the ring node ID look-up table in memory. Then, control is passed to operational block 707 which causes the identity (ID) of the affected communications circuits to be obtained from the communications circuit ID look-up table in memory. If step 703 indicates a single ring node failure, the failed ring node ID is already known and control is passed directly to step 707. Once the affected communications circuits are identified, operational block 708 causes the appropriate ones of squelchers (S) 204, 210, 217 and 219 (FIG. 2), in this example, to squelch those identified communications circuits in the ring node. As indicated above, all communications circuits active in this ring node which are not redirectable that are terminated in an adjacent failed ring node are squelched. For the purpose of squelching a broadcast communications circuit, only the first "A" and last "Z" terminations are used to trigger the squelching. A redirectable communications circuit is treated, for the purposes of squelching, from the so-called normal side of the communications circuit but not from the other side of the circuit, like a broadcast communications circuit from its A termination ring node to its primary and alternate Z termination ring nodes. Operational block 704 causes the communications circuits not terminated in the failed ring node(s) to be bridged and switched to "heal" the ring. Again, it is noted that redirectable communications circuits are loop back switched, as appropriate, to be supplied to their alternate ring node. Additionally, when the alternate ring node is in the normal side of the communications circuit prior to the failed ring node the redirectable communications circuits destined for the failed ring node are directly intercepted at the alternate ring node from the service bandwidth of transmission paths 110 and 120 by appropriately adding and dropping them. Thereafter, the process is ended in step 705.

Figure 8:
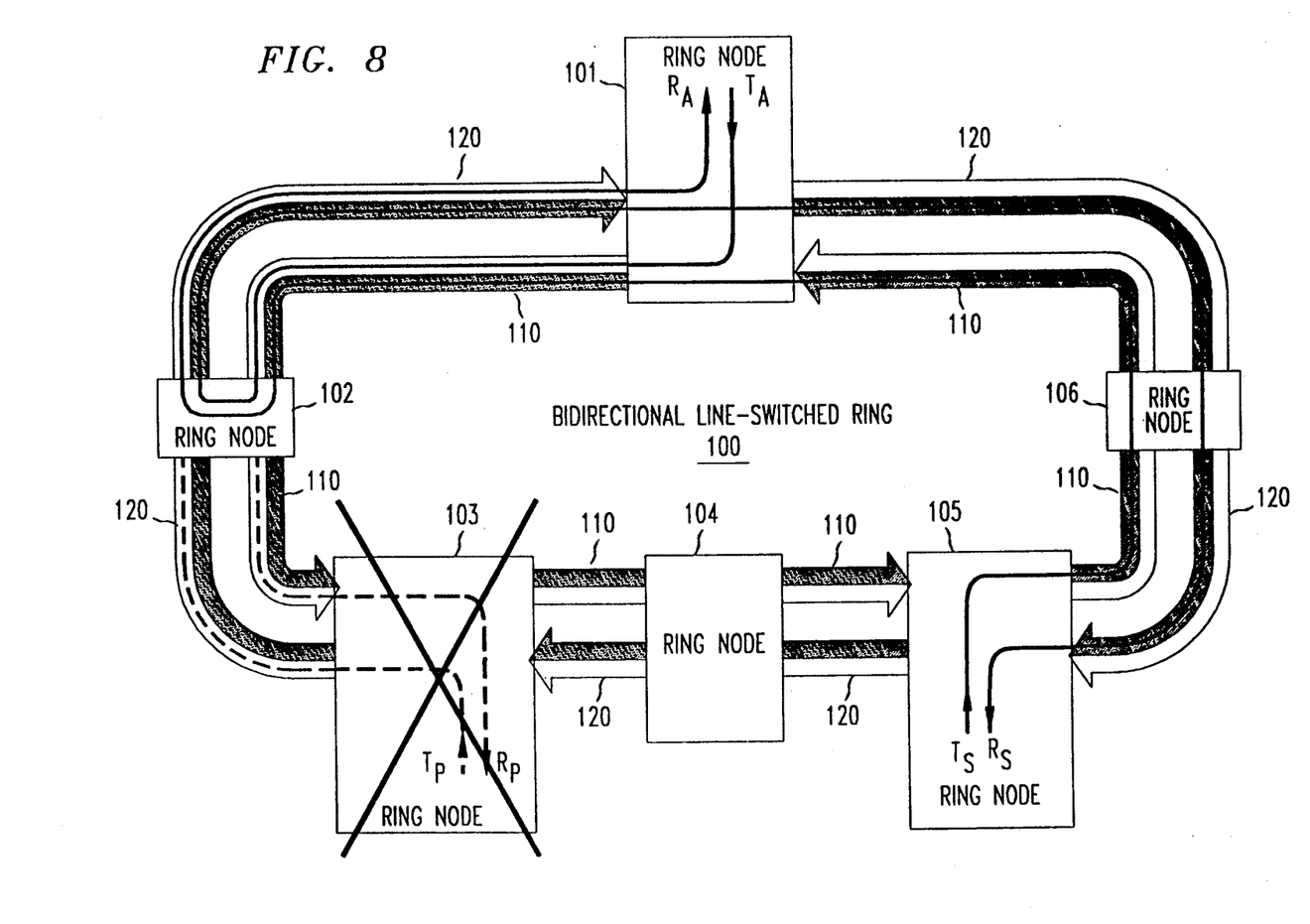
FIG. 8 illustrates the operation of bidirectional line-switched ring 100 in the presence of a first hubbing ring node failure condition.

FIG. 8 illustrates a redirected communications circuit connection which is effected, in accordance with the invention, when ring node 103 for the communications circuit has failed. Ring node 105 is, in this example, the alternate ring node which will terminate, in accordance with the invention, redirectable communications circuits intended to be terminated in ring node 103 when it fails. In this example, ring nodes 102 and 104 both detect loss-of-signal from ring node 103 and both transmit a line-switch request message in a direction away from failed ring node 103. Thus, ring node 102 transmits a line-switch request message identifying a signal failure condition from ring node 103 in the APS K1 byte on transmission path 120. Ring nodes 101, 106 and 105 recognize that the line-switch request message is not for an adjacent failed ring node and pass it on to ring node 104. Similarly, ring node 104 transmits a line-switch request message identifying a signal failure condition from ring node 103 in the APS K1 byte on transmission path 110 in a direction away from the failure. Again, ring nodes 105, 106 and 101 recognize that the line-switch request message is not for an adjacent failed ring node and pass it on to ring node 102. Because ring nodes 102 and 104 both have detected a signal failure condition from ring node 103 and the received line-switch request message indicating a signal failure condition in the opposite direction from ring node 103, they each know that adjacent ring node 103 has failed. Alternate ring node 105 also knows from the switch request messages that ring node 103 has failed and that redirectable communications circuits terminated in failed ring node 103 are now to be controllably terminated at ring node 105. Normally, when an adjacent ring node fails, all active communications circuits terminated in it would be squelched in order to eliminate possible communications circuit misconnections. However, since a redirectable communications circuit connection for particular communications circuits terminated in ring node 103 has been provisioned, in accordance with the invention, those communications circuits are controllably selectively not squelched on the normal side of the communications circuit in ring node 102 but are squelched on the other side of the communications circuit in ring node 104. Thus, as shown, a first portion ($T_A$) of the duplex communications circuit terminated in ring node 103 enters ring 100 at ring node 101 and is transmitted toward ring node 103 in the service bandwidth on transmission path 110. Upon failure of ring node 103, the $T_A$ portion of the communications circuit is controllably selectively not squelched and controllably loop back switched at ring node 102 to the protection bandwidth of and transmitted toward alternate ring node 105 on transmission path 120. At alternate ring node 105, the $T_A$ portion of the communications circuit is controllably intercepted directly from the protection bandwidth of transmission path 120 and dropped at node 105 as $R_S$, in accordance with the principles of the invention. Similarly, the other portion ($T_S$) of the communications circuit intended to be supplied from failed ring node 103 terminated in ring node 101 as $R_A$ is supplied by ring node 105 directly to the protection bandwidth on transmission path 110. At ring node 102, this $T_S$ portion of the communications circuit is loop back switched to the service bandwidth on transmission path 120. It is then supplied to ring node 101 where it is received in normal fashion as $R_A$.

Figure 9:
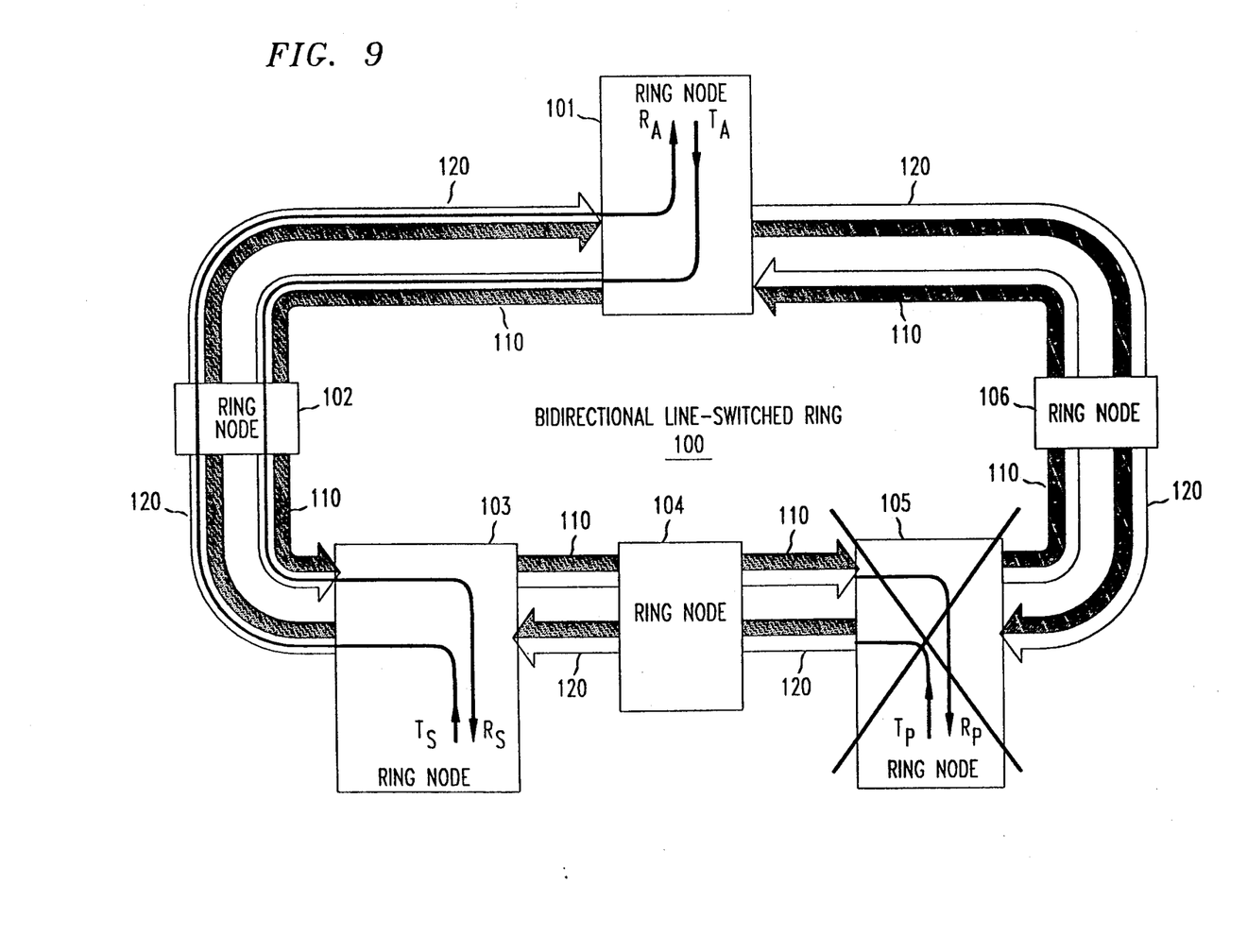
FIG. 9 illustrates the operation of bidirectional line-switched ring 100 in the presence of a second hubbing ring node failure condition.

FIG. 9 illustrates a redirected communications circuit which is effected in ring 100, in accordance with the principles of the invention, when alternate ring node 103 for ring node 105 is in the "normal" side of the communications circuit between the A termination ring node 101 for the communications circuit and failed ring node 105. Ring node 103 is, in this example, the alternate ring node which will terminate, in accordance with the invention, redirectable communications circuits intended to be terminated in ring node 105 when it fails. In this example, ring nodes 104 and 106 both detect loss-of-signal from ring node 105 and both transmit a line-switch request message in a direction away from failed ring node 105. Thus, ring node 104 transmits a line-switch request message identifying a signal failure condition from ring node 105 in the APS K1 byte on transmission path 120. Ring nodes 103, 102 and 101 recognize that the line-switch request message is not for an adjacent failed ring node and pass it on to ring node 106. Similarly, ring node 106 transmits a line-switch request message identifying a signal failure condition from ring node 105 in the APS K1 byte on transmission path 110 in a direction away from the failure. Again, ring nodes 101, 102 and 103 recognize that the line-switch request message is not for an adjacent failed ring node and pass it on to ring node 104. Because ring nodes 104 and 106 both have detected a signal failure condition from ring node 105 and the received line-switch request message indicating a signal failure condition in the opposite direction from ring node 105, they each know that adjacent ring node 105 has failed. Alternate ring node 103 also knows from the switch request messages that ring node 105 has failed and that redirectable communications circuits terminated in failed ring node 105 are now to be controllably terminated at ring node 103. In this example since alternate ring node 103 is in the so-called normal side of the communications circuit connection destined for ring node 105, ring nodes 104 and 106 will squelch all communications circuits terminated in failed ring node 105. However, since a redirectable communications circuit connection for particular communications circuits terminated in ring node 105 has been provisioned, in accordance with the invention, those communications circuits are controllably intercepted in alternate ring node 103 directly from the service bandwidth of transmission paths 110 and 120. Thus, as shown, a first portion ($T_A$) of the duplex communications circuit terminated in ring node 105 enters ring 100 at ring node 101 and is transmitted toward ring node 105 in the service bandwidth on transmission path 110. Upon failure of ring node 105, the $T_A$ portion of the communications circuit is controllably intercepted at alternate ring node 103 directly from the service bandwidth of transmission path 110 and dropped at node 103 as $R_S$, in accordance with the principles of the invention. Similarly, the other portion ($T_S$) of the communications circuit intended to be supplied from failed ring node 105 terminated in ring node 101 as $R_A$ is supplied by ring node 103 directly to the service bandwidth on transmission path 120. It is then supplied to ring node 101 where it is received in normal fashion as $R_A$.

The above-described arrangements are, of course, merely illustrative of the application of the principles of the invention. Other arrangements may be devised by those skilled in the art without departing from the spirit or scope of the invention.

I claim:

1. A ring node for use in a bidirectional line-switched ring transmission system having a plurality of ring nodes interconnected by first and second transmission paths, the first transmission path transporting communications circuits around the ring transmission system from ring node to ring node in a first direction and the second transmission path transporting communications circuits around the ring transmission system from ring node to ring node in a second direction opposite the first direction, the ring node comprising:

means for storing entries identifying communications circuits active in the ring node, as well as an indication as to whether any of said active communication circuits are redirectable to an alternate ring node;

means for monitoring signals incoming to the ring node to determine whether one or more ring nodes adjacent to this ring node have failed and for determining the identity of said failed one or more ring nodes;

means responsive to said identity of said failed one or more ring nodes for determining which of said active communications circuits in the ring node are terminated in said failed one or more ring nodes; and means responsive to said identity of communications circuits terminated in said failed one or more ring nodes for redirecting those communications circuits in this ring node which are redirectable to an alternate ring node designated for said failed ring node.

2. The invention as defined in claim 1 wherein said means for redirecting includes means for normally squelching communications circuits terminated in said failed adjacent node and for not squelching any of said communications circuits terminated in said failed adjacent ring node that are indicated as being redirectable.

3. The invention as defined in claim 2 wherein each of said stored entries identifying said active communications circuits includes an indication as to whether this ring node is an alternate termination ring node for any redirectable communications circuits normally terminated in another ring node in the bidirectional line-switched ring transmission system and further including means for directly intercepting said redirectable communications circuits when said another ring node fails for which this ring node is an alternate.

4. The invention as defined in claim 3 wherein said active communications circuits include communications circuits added at the ring node, communications circuits dropped at the ring node or communications circuits passing through the ring node.

5. The invention as defined in claim 3 wherein said means for monitoring includes means for detecting a signal failure condition incoming to the ring node on either of the first and second transmission paths and means for detecting line-switch request messages in digital signals incoming to the ring node on either of the first and second transmission paths.

6. The invention as defined in claim 5 wherein each of the first and second transmission paths comprises service bandwidth and protection bandwidth, said line-switch request message being transported in an automatic protection switch channel in the protection bandwidth of both the first transmission path and the second transmission path.

7. The invention as defined in claim 6 wherein said means for directly intercepting includes means for directly intercepting said redirectable communications circuits from said protection bandwidth when said another ring node for which this ring node is an alternate is in the normal side of said redirectable communications circuits relative to this ring node.

8. The invention as defined in claim 7 wherein said means for directly intercepting further includes means for directly intercepting said redirectable communications circuits from said service bandwidth when this ring node is in the normal side of said redirectable communications circuits relative to said another ring node for which this ring node is an alternate.

9. The invention as defined in claim 8 wherein said automatic protection switch channel comprises at least a K1 byte in said protection bandwidth overhead.

10. The invention as defined in claim 9 further including means for storing identities of ring nodes in the bidirectional line-switched ring transmission system and wherein said means for determining is responsive to said detected line-switch request messages for obtaining the identity of said failed one or more ring nodes from said means for storing said ring node identities.

11. The invention as defined in claim 10 wherein said means for squelching includes means for blocking transmission of said communications circuits terminated in said failed ring node when this ring node is in the other side of said communications circuits terminated in said adjacent failed ring node.

12. A bidirectional line-switched ring transmission system including:

a plurality of ring nodes;

a first transmission path interconnecting said plurality of ring nodes and transporting communications circuits around the ring transmission system from ring node to ring node in a first direction of transmission;

a second transmission path interconnecting said plurality of ring nodes and transporting communications circuits around the ring transmission system from ring node to ring node in a second direction of transmission opposite the first direction of transmission;

each of said plurality of ring nodes comprising:

means for storing entries identifying communications circuits active in the ring node, as well as an indication as to whether any of said active communication circuits are redirectable to an alternate ring node;

means for monitoring signals incoming to the ring node to determine whether one or more ring nodes adjacent to this ring node have failed and for determining the identity of said failed one or more ring nodes;

means responsive to said identity of said failed one or more ring nodes for determining which of said active communications circuits in the ring node are terminated in said failed one or more ring nodes; and means responsive to said identity of communications circuits terminated in said failed one or more ring nodes for redirecting those communications circuits in this ring node which are redirectable to an alternate ring node designated for said failed ring node.

13. The invention as defined in claim 12 wherein said means for redirecting includes means for normally squelching communications circuits terminated in said failed adjacent node and for not squelching any of said communications circuits terminated in said failed adjacent node that are indicated as being redirectable.

14. The invention as defined in claim 13 wherein each of said stored entries identifying said active communications circuits includes an indication as to whether this ring node is an alternate termination ring node for any redirectable communications circuits normally terminated in another ring node in the bidirectional line-switched ring transmission system and further including means for directly intercepting said redirectable communications circuits when said another ring node fails for which this ring node is an alternate.

15. The invention as defined in claim 14 wherein said active communications circuits include communications circuits added at the ring node, communications circuits dropped at the ring node or communications circuits passing through the ring node.

16. The invention as defined in claim 14 wherein said means for monitoring includes means for detecting a signal failure condition incoming to the ring node on either of the first and second transmission paths and means for detecting line-switch request messages in digital signals incoming to the ring node on either of the first and second transmission paths.

17. The invention as defined in claim 16 wherein each of the first and second transmission paths comprises service bandwidth and protection bandwidth, said line-switch request message being transported in an automatic protection switch channel in the protection bandwidth of both the first transmission path and the second transmission path.

18. The invention as defined in claim 17 wherein said means for directly intercepting includes means for directly intercepting said redirectable communications circuits from said protection bandwidth when said another ring node for which this ring node is an alternate is in the normal side of said redirectable communications circuits relative to this ring node.

19. The invention as defined in claim 18 wherein said means for directly intercepting further includes means for directly intercepting said redirectable communications circuits from said service bandwidth when this ring node is in the normal side of said redirectable communications circuits relative to said another ring node for which this ring node is an alternate.

20. The invention as defined in claim 19 wherein said automatic protection switch channel comprises at least a K1 byte in said protection bandwidth overhead.

21. The invention as defined in claim 20 further including means for storing identities of ring nodes in the bidirectional line-switched ring transmission system and wherein said means for determining is responsive to said detected line-switch request messages for obtaining the identity of said failed one or more ring nodes from said means for storing said ring node identities.

22. The invention as defined in claim 21 wherein said means for squelching includes means for blocking transmission of said communications circuits terminated in said failed ring adjacent ring node when the ring node is in the other side of said communications circuits terminated in said adjacent failed ring node.

23. In a bidirectional line-switched ring transmission system including:
a plurality of ring nodes;
a first transmission path interconnecting said plurality of ring nodes and transporting communications circuits around the ring transmission system from ring node to ring node in a first direction of transmission; and
a second transmission path interconnecting said plurality of ring nodes and transporting communications circuits around the ring transmission system from ring node to ring node in a second direction of transmission opposite the first direction of transmission;
a method of redirecting communications circuits comprising the steps of:
provisioning in each of said plurality of ring nodes entries identifying communications circuits active in the particular ring node, as well as an indication as to whether any of said active communication circuits are redirectable to an alternate ring node;
monitoring signals incoming to the ring node to determine whether one or more ring nodes adjacent to the ring node have failed;
determining the identity of said failed one or more ring nodes;
in responsive to said identity of said failed one or more ring nodes, determining which of said active communications circuits in the ring node are terminated in said failed one or more ring nodes; and
in responsive to said identity of communications circuits terminated in said failed one or more ring node nodes, redirecting those communications circuits in the ring node which are redirectable to an alternate ring node designated for said failed ring node.

24. The invention as defined in claim 23 wherein said step of redirecting includes a step of normally squelching communications circuits terminated in said failed adjacent ring node and a step of not squelching said communications circuits terminated in said failed adjacent ring node that are indicated as being redirectable.

25. The invention as defined in claim 24 wherein each of said stored entries identifying said active communications circuits includes an indication as to whether this ring node is an alternate termination ring node for any redirectable communications circuits normally terminated in another ring node in the bidirectional line-switched ring transmission system and further including the step of directly intercepting said redirectable communications circuits when said another ring node fails for which this ring node is an alternate.

26. The invention as defined in claim 25 wherein said active communications circuits include communications circuits added at the ring node, communications circuits dropped at the ring node or communications circuits passing through the ring node.

27. The invention as defined in claim 25 wherein said step of monitoring includes a step of detecting a signal failure condition incoming to the ring node on either of the first and second transmission paths and a step of detecting line-switch request messages in digital signals incoming to the ring node on either of the first and second transmission paths.

28. The invention as defined in claim 27 wherein each of the first and second transmission paths comprises service bandwidth and protection bandwidth, said line-switch request message being transported in an automatic protection switch channel in the protection bandwidth of either the first transmission path or the second transmission path.

29. The invention as defined in claim 28 wherein said step of directly intercepting includes a step of directly intercepting said redirectable communications circuits from said protection bandwidth when said another ring node for which this ring node is an alternate is in the normal side of said redirectable communications circuits relative to this ring node.

30. The invention as defined in claim 29 wherein said step of directly intercepting further includes a step of directly intercepting said redirectable communications circuits from said service bandwidth when this ring node is in the normal side of said redirectable communications circuits relative to said another ring node for which this ring node is an alternate.

31. The invention as defined in claim 30 wherein said automatic protection switch channel comprises at least a K1 byte in said protection bandwidth overhead.

32. The invention as defined in claim 31 further including a step of storing identities of ring nodes in the bidirectional line-switched ring transmission system and wherein said step of determining is responsive to said detected line-switch request messages for obtaining the identity of the failed one or more ring nodes from said stored ring node identities.

33. The invention as defined in claim 32 wherein said step of controllably squelching includes a step of blocking transmission of said communications circuits terminated in said failed one or more ring nodes when the ring node is in the other side of the communications circuits terminated in said adjacent failed ring node.

* * * * *